Figure 1:
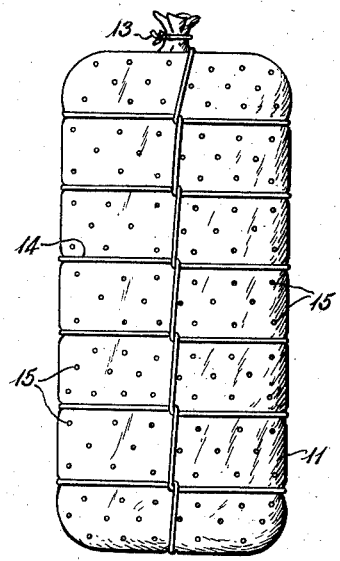

Nov. 11, 1947. G. J. KELLERMANN 2,430,818
MEAT PRODUCT AND PROCESS OF MAKING THE SAME
Filed Aug. 20, 1943

Gustav J. Kellermann
Inventor

By R. G. Story
Attorneys

Patented Nov. 11, 1947

2,430,818

UNITED STATES PATENT OFFICE 2,430,818

MEAT PRODUCT AND PROCESS OF MAKING THE SAME

Gustav J. Kellermann, Chicago, Ill., assignor to Industrial Patents Corporation, Chicago, Ill., a corporation of Delaware Application August 20, 1943, Serial No. 499,317

4 Claims. (Cl. 99—159)

This invention relates to a meat product and process of making the same and more particularly to a new process of making cased and cured meat products and the product resulting therefrom.

In the production of cured meat products from meat cuts such as boneless shoulder butts, the provision of a casing for the product has been recognized as desirable in order to protect the meat during storage. The use of casings, however, has the disadvantage that it is difficult to prevent air pockets or voids from being formed between the casing and the meat cut. Such voids not only impair the appearance of the meat product but form fertile fields for growth of molds or bacteria causing spoilage of the meat product.

The present invention finds its chief utility in the production of cured and cased meat products made from fresh meat cuts, for example trimmed boneless shoulder butts and similar cuts of meat. The term "fresh meat cuts" is employed herein to mean uncured meat cuts irrespective of whether such cuts have been previously frozen or otherwise stored. The fresh meat cuts are first shaped as uniformly as possible and stuffed into natural animal casings, for example beef casings, the stuffed product is then massaged or otherwise treated to eliminate air pockets as far as practicable and the casing then closed. The stuffed product is then usually wrapped with twine and is preferably punctured in a plurality of places with a sharp pointed instrument to release air pockets which may be present after the massaging and closing operation. The stuffed and wrapped product is then cured usually by soaking in a curing solution and thereafter subjected to a smoke house operation. Thus, the meat is cured and smoked in the casing, the casing being cured along with the meat. The meat swells during the curing operating while the casing tends to shrink so that the casing conforms to the surface of the meat cut. The casing also adheres to the meat, resulting in a product which is substantially entirely free of air, fat or water pockets, and furthermore, the casing itself is brightened by the curing and smoking operation and becomes more red in color so as to take on substantially the same color as the meat. In fact, the casing appears to become a part of the meat so that not only is a meat product substantially free of voids produced, but also the appearance of the final product is markedly improved over meat products in which the meat cuts are stuffed into casings after curing.

It is, therefore, an object of the present invention to provide an improved method of producing cured meat products in which meat cuts are stuffed into animal casings prior to curing and smoking operations.

Another object of the invention is to provide a method of producing cured meat products in which an animal casing is cured along with the meat and a product produced which is substantially entirely free of voids.

Another object of the invention is to provide an improved cured meat product in which a cured animal casing becomes substantially integral with the meat product.

A further object of the invention is to provide a cured and smoked meat product which is substantially free of voids and in which the appearance of the product is enhanced by curing the product after the meat cuts have been cased in animal casings.

Figure 2:
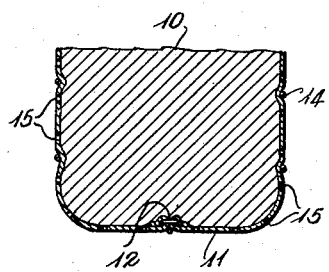

Other objects and advantages of the invention will appear in the following description of a preferred embodiment of the invention in connection with the attached drawing of which Fig. 1 shows a cured meat product in accordance with the present invention; and Fig. 2 is a fragmentary section of the meat product of Fig. 1.

Referring to Figs. 1 and 2, the meat product of the present invention preferably includes a desired cut of meat 10 such as a boneless shoulder butt positioned in an animal casing 11, for example beef intestine or the like. Although in Figure 2, for purposes of illustration, the casing 11 is shown as a separate element, in the process of the present invention, the casing becomes substantially integral with the meat cut although the casing can be peeled from the meat. Preferably one end of the casing is sewed as indicated at 12, the other end of the casing being tied as indicated at 13, although either end of the casing can be closed in any desired manner. The stuffed meat product is preferably wrapped with string, such as cotton twine, as indicated at 14, and the casing is preferably perforated substantially throughout its area as indicated at 15.

In the production of the meat product of the present invention, animal casings, preferably large sized animal casings such as beef intestines, are thoroughly cleaned and washed and cut into appropriate lengths. One end of the casing is then preferably sewed although casings tied at both ends may be employed. After one end of the casing has been closed by tying or sewing, a fresh meat cut, for example a standard trimmed boneless shoulder butt, is stuffed into the casing. This is preferably accomplished by known procedure such as by the employment of a stuffing horn which compresses and shapes the meat cut being stuffed into the casing. After stuffing and before closing the other end of the casing the stuffed product is preferably massaged either by hand or with suitable rollers to eliminate as far as possible all air pockets. The open end is then tied and/or otherwise suitably closed and the stuffed product wrapped with string, for example with loops 1½ to 2 inches apart, preferably using cotton twine. Prior to further processing the casing is preferably punctured, for example by use of a paddle having sharp pointed projections such as nails protruding therefrom. The apertures thus produced should be small in diameter, for example not over 1/16 inch in diameter, and are preferably substantially uniformly distributed over the area of the stuffed product. For example, the perforations may range from ½ to 1 inch apart. This substantially eliminates any possibility of air pockets being retained in the final product.

The resultant product is then placed in a curing vat and cured according to any known or suitable curing operation, for example the meat can be cured by brine pickling, sweet pickling, etc. Such curing operations usually require extended periods of time, for example from 14 to 17 days, and during the curing operation the meat tends to swell while the casings tend to shrink. The casings are thus pulled into any depressions in the meat cut and any air entrapped escapes through the puncture apertures and this is particularly true if the products are turned or overhauled a plurality of times during the curing operation. After the product is thoroughly cured it is then subjected to any suitable or known smoke house operation, for example by processing the cured products by passing them, suitably suspended, through smoking and cooking ovens. During the curing and smoke house operations the casings become substantially integral with the meat and take on a bright red color. Also, the perforations in the casings close or heal so that they become substantially indistinguishable except upon close inspection, the covering of the meat again becoming substantially continuous such that bacteria or mold spores are prevented from reaching the meat proper. Furthermore, the casings become substantially a part of the meat product.

One advantage of the present process of casing and curing meat cuts is that flavoring materials such as pepper, paprika and other spices may be incorporated into the meat product prior to the curing operation. Thus, such spices may be rubbed on the surfaces of the meat cut prior to stuffing into the natural casing and prior to curing. By processing in this manner the product absorbs, during the curing operation, substantially all of the flavor which is derived from the spices. This flavor penetrates substantially throughout the meat products. Heretofore it has been considered impracticable to attempt to apply such flavoring materials directly to a meat product prior to curing which, in accordance with conventional processes, is carried on in the absence of casings, as such flavoring materials are largely lost in the curing operation. Such flavoring materials have been applied to the meat product after curing and prior to casing and smoking but penetration of the flavoring materials into the cured meat product is not substantial. Thus the present invention provides a meat product which has improved flavor and keeping qualities as well as having an improved appearance.

While I have disclosed the preferred embodiment of my invention, it is understood that the details thereof may be varied within the scope of the following claims.

I claim:

1. The method of preparing a cured, boneless shoulder butt made from a fresh pork shoulder which comprises rubbing the surface of said boneless shoulder butt with flavoring ingredients; stuffing said rubbed butt into a natural casing made from beef intestines; soaking the stuffed rubbed shoulder butt encased in the natural casing in a curing bath; and shrinking the casing on the butt by curing and smoking the stuffed butt whereby the casing becomes integrated with the butt and acquires a color such that it blends in with the cured and smoked butt to be substantially indistinguishable therefrom.

2. The method of preparing a cured, boneless shoulder butt made from a fresh pork shoulder which comprises rubbing the surface of said fresh shoulder butts with flavoring ingredients; stuffing said rubbed boneless shoulder butts into a perforated natural casing made from beef intestines having apertures produced therein; soaking the stuffed rubbed shoulder butt encased in the natural casing in a curing bath; and shrinking the casing on the butt by smoking the stuffed butt whereby the casing becomes integrated with the butt, the apertures are sealed, and the casing acquires a color such that it blends in with the cured and smoked butt to be substantially indistinguishable therefrom.

3. A product of manufacture comprising a boneless, spiced, cured, and smoked pork shoulder butt encased in a natural casing; said spice having been rubbed onto the surface of said butt prior to insertion into said casing; said casing having been cured and smoked simultaneously in situ with the butt; said casing having perforations therein and being made from beef intestines; said casing, upon being cured and smoked with the butt, becoming integrated with the butt and having the perforations sealed; also, said natural casing, upon being cured and smoked with the butt, having substantially the color of the cured and smoked butt such that it blends in with and becomes substantially indistinguishable from the smoked and cured butt.

4. A product of manufacture comprising a boneless, spiced, cured, and smoked pork shoulder butt encased in a natural casing; said spice being caused to penetrate substantially throughout the product by being rubbed onto the surface of said butt prior to insertion into said casing; said casing having been cured and smoked simultaneously in situ with the butt; said casing, upon being cured and smoked with the butt, becoming integrated with the butt and having the perforations sealed.

GUSTAV J. KELLERMANN.

REFERENCES CITED

The following references are of record in the file of this patent:

UNITED STATES PATENTS

| Number | Name | Date |
|---|---|---|
| 1,984,435 | Seaver | Dec. 18, 1934 |
| 174,938 | Bertch | Mar. 21, 1876 |
| 1,195,176 | Benn | Aug. 22, 1916 |
| 1,508,155 | Berg | Sept. 9, 1924 |